US009581708B2

(12) United States Patent
Khajeh et al.

(10) Patent No.: US 9,581,708 B2
(45) Date of Patent: Feb. 28, 2017

(54) GUIDED ACOUSTIC WAVES ISOLATION SYSTEM FOR DOWNHOLE APPLICATIONS (71) Applicants: Ehsan Khajeh, Spring, TX (US); Roger R. Steinsiek, Houston, TX (US); Ryan D. Green, League City, TX (US)

(72) Inventors: Ehsan Khajeh, Spring, TX (US); Roger R. Steinsiek, Houston, TX (US); Ryan D. Green, League City, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 169 days.

(21) Appl. No.: 14/477,316

(22) Filed: Sep. 4, 2014

(65) Prior Publication Data
US 2016/0070014 A1  Mar. 10, 2016

(51) Int. Cl.
*G01V 1/30* (2006.01)
*G01V 1/50* (2006.01)

(52) U.S. Cl.
CPC .............. *G01V 1/306* (2013.01); *G01V 1/50* (2013.01); *G01V 2210/1299* (2013.01)

(58) Field of Classification Search
CPC .... G01V 1/306; G01V 1/50; G01V 2210/1299
USPC .......................................................... 367/25
See application file for complete search history.

(56) References Cited

U.S. PATENT DOCUMENTS

| | | | |
|---|---|---|---|
| 3,831,115 A * | 8/1974 | Coldren .................. | H03H 9/42 333/150 |
| 4,208,906 A * | 6/1980 | Roberts, Jr. ............ | E21B 47/101 702/9 |
| 4,671,114 A * | 6/1987 | Litzkow .................. | A01M 1/026 73/587 |
| 4,759,000 A | 7/1988 | Reitz | |
| 5,159,838 A | 11/1992 | Lynnworth | |
| 5,515,733 A | 5/1996 | Lynnworth | |
| 5,852,262 A | 12/1998 | Gill et al. | |
| 2005/0022987 A1 | 2/2005 | Green et al. | |

(Continued)

OTHER PUBLICATIONS

Shepard, et al., "Measurements of Density and Viscosity of One- and Two-Phase Fluids with Torsional Waveguides," IEEE Transactions on Ultrasonics, Ferroelectrics, and Freqijency Control, vol. 46. No. 3, May 1999, pp. 536-548.*

(Continued)

*Primary Examiner* — Daniel L Murphy
(74) *Attorney, Agent, or Firm* — Cantor Colburn LLP (57) ABSTRACT

An apparatus for estimating a property of a subsurface material includes a carrier configured to convey an acoustic wave guide though a borehole. The acoustic wave guide includes an acoustic plate configured to guide an acoustic wave along a path of the plate and an acoustic reservoir coupled to the acoustic plate and at least partially surrounding the acoustic plate. The acoustic reservoir has a mass greater than the mass of the acoustic plate and is configured to absorb acoustic wave leakage from the acoustic plate. A first acoustic transducer is coupled to the acoustic plate and configured to transmit an acoustic wave along the path. A second acoustic transducer is coupled to the acoustic plate and configured to receive the acoustic wave that travels along the path. A controller is configured to operate the first acoustic transducer and the second acoustic transducer in order to estimate the property.

18 Claims, 6 Drawing Sheets

(56) References Cited

U.S. PATENT DOCUMENTS

2007/0005251 A1* 1/2007 Chemali ................. G01V 1/50
702/6

OTHER PUBLICATIONS

Bellabarba, et al.; "Ensuring Zonal Isolation Beyond the Life of the Well";OilReview (2008); 14 pages.
International Search Report and the Written Opinion of the International Searching Authority; PCT/US2015/048301; Mailed Nov. 27, 2015; 11 pages.

* cited by examiner

GUIDED ACOUSTIC WAVES ISOLATION SYSTEM FOR DOWNHOLE APPLICATIONS

BACKGROUND

Earth formations may be used for various purposes such as hydrocarbon production, geothermal production, and carbon dioxide sequestration. In order to efficiently use an earth formation, the formation is characterized by performing measurements of many different properties using one or more tools conveyed through a borehole penetrating the formation. One category of tools is acoustic tools that use sound waves to perform various measurements such as measuring fluid impedance or fluid velocity of a fluid disposed in a borehole. One challenge presented by such tools is signal leakage, which can lower signal to noise ratio. Another challenge is signal interference caused by reflections of the signal leakage, which can distort the received signal. Hence, it would be well received in the drilling industry if acoustic downhole tools were developed that reduced acoustic signal leakage and acoustic signal reflections.

BRIEF SUMMARY

Disclosed is an apparatus for estimating a property of a subsurface material. The apparatus includes: a carrier configured to be conveyed through a borehole penetrating the earth; an acoustic wave guide coupled to the carrier, the acoustic wave guide having an acoustic plate configured to guide an acoustic wave along a path of the plate and an acoustic reservoir coupled to the acoustic plate and at least partially surrounding the acoustic plate, the acoustic reservoir having a mass greater than the mass of the acoustic plate and being configured to absorb leakage of the acoustic wave from the acoustic plate; a first acoustic transducer coupled to the acoustic plate and configured to transmit an acoustic wave along the path; a second acoustic transducer coupled to the acoustic plate and configured to receive the acoustic wave that travels along the path; and a controller configured to operate the first acoustic transducer and the second acoustic transducer in order to estimate the property.

Also disclosed is a method for estimating a property of a subsurface material. The method includes: conveying a carrier through a borehole penetrating the earth, the carrier being coupled to an acoustic wave guide having an acoustic plate configured to guide an acoustic wave along a path of the acoustic plate and an acoustic reservoir coupled to the acoustic plate and at least partially surrounding the acoustic plate, the acoustic reservoir having a mass greater than the mass of the acoustic plate and being configured to absorb leakage of the acoustic wave from the acoustic plate; transmitting an acoustic wave along the path of the acoustic plate using a first acoustic transducer; receiving the acoustic wave that travels along the path using a second acoustic transducer; and estimating the property using a controller that operates the first acoustic transducer and the second acoustic transducer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for estimating a property of a subsurface material acoustically. Acoustic transducers transmit or receive acoustic signals into or from an acoustic waveguide that channels the acoustic signal along a path defined by an acoustic plate in the waveguide. The subsurface material of interest is disposed on the acoustic plate and interacts with the acoustic signal transmitted along the acoustic plate. The acoustic waveguide includes an acoustic reservoir that surrounds the acoustic plate and is acoustically isolated from the acoustic plate. The acoustic reservoir is configured to absorb leakage of the acoustic signal from the plate to prevent interference of the leakage with a received acoustic signal. A controller operates the acoustic transducers and estimates the property based on characteristics of the transmitted and received acoustic signal. Non-limiting embodiments of the property include acoustic impedance and acoustic velocity of the subsurface material. Once obtained, these properties may be used to interpret other data such as data obtained from casing and cementing inspections.

Figure 1:
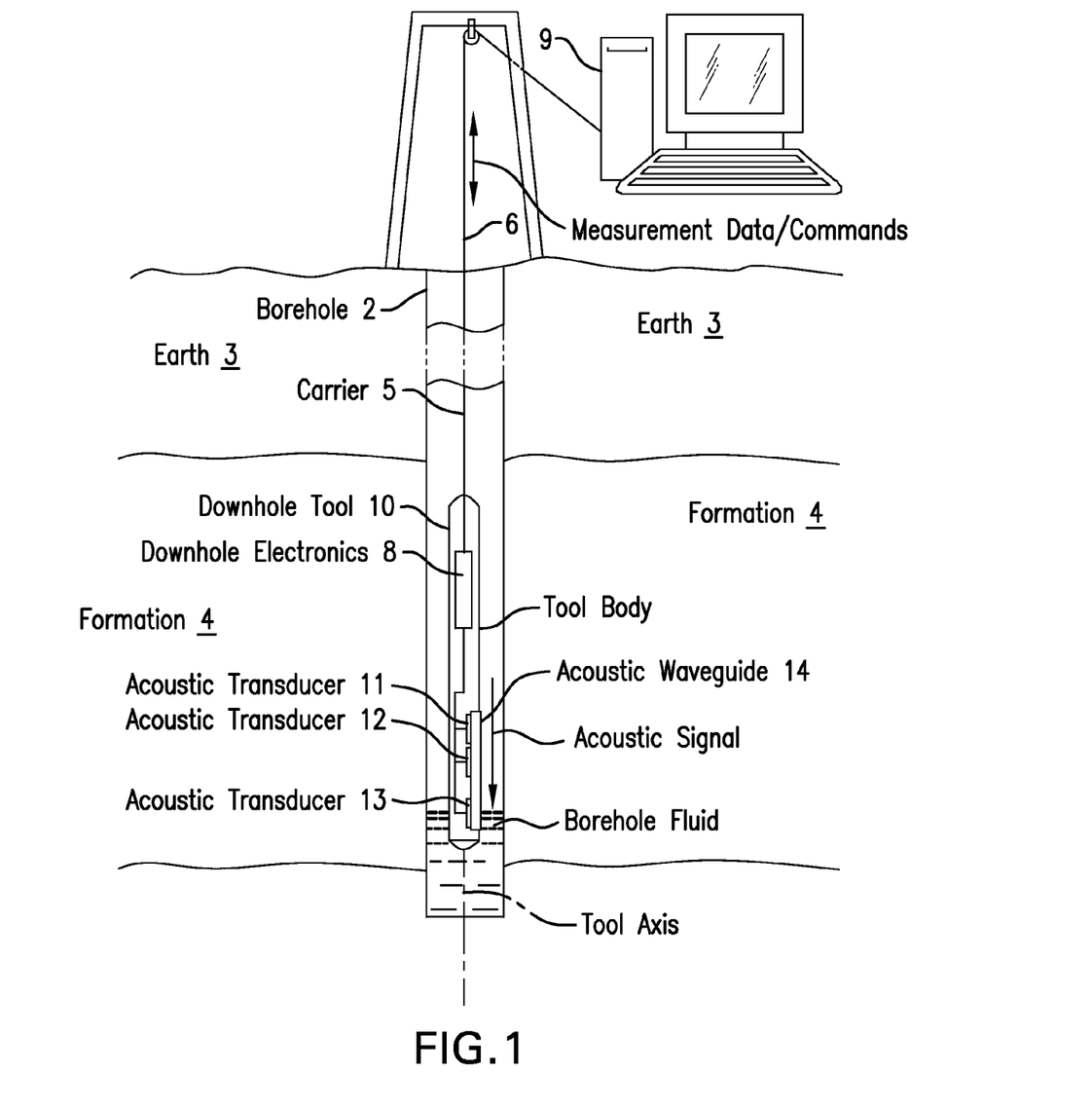
FIG. 1 illustrates a cross-sectional view of an exemplary embodiment of an acoustic downhole tool disposed in a borehole penetrating the earth.

FIG. 1 illustrates a cross-sectional view of an exemplary embodiment of an acoustic downhole tool 10 disposed in a borehole 2 penetrating the earth 3, which may include an earth formation 4. The formation 4 represents any subsurface material of interest that may be sensed by the tool 10. The term "subsurface material" may be used to refer to any material below the surface of the earth 3, such as the formation 4, a formation fluid or solid, and a borehole material, as non-limiting examples. The downhole tool 10 is conveyed through the borehole 2 by a carrier 5. In the embodiment of FIG. 1, the carrier 5 is an armored wireline 6. Besides supporting the downhole tool 10, the wireline 6 can provide communications (i.e., telemetry) between the downhole tool 10 and a computer processing system 9 disposed at the surface of the earth 3. Communications can include sending measurements uphole to the computer processing system 9 or commands downhole to the downhole tool 10. In order to operate the downhole tool 10, process measurement data, and/or provide a communications interface with the surface computer processing system 9, the downhole tool 10 includes downhole electronics 8. The operating and processing functions (i.e., control functions) of the disclosure may be performed by the downhole electronics 8, the computer processing system 9, or a combination thereof. Hence, the downhole electronics 8 and/or the computer processing system 9 may be referred to as a controller. In an alternative embodiment referred to as logging-while-drilling (LWD) or measurement-while-drilling (MWD), the carrier 5 can be a drill string or drill tubular. In wireline, LWD, or MWD embodiments, measurement data may be downloaded in real time or after the downhole tool 10 is retrieved from the borehole 2. Non-limiting embodiments of the telemetry for LWD or MWD embodiments include pulsed-mud and wired drill pipe. The downhole tool 10 may be operated continuously or at discrete selected depths in the borehole 2.

The acoustic downhole tool 10 includes a first acoustic transducer 11, a second acoustic transducer 12 and a third acoustic transducer 13. Each of the transducers 11, 12 and 13 are acoustically coupled to an acoustic wave guide 14. The first acoustic transducer 11 is configured to convert an electrical signal into a corresponding acoustic signal (i.e., sound wave) that is transmitted into the acoustic wave guide 14. The second acoustic transducer 12 and the third acoustic transducer 13 are configured to receive an acoustic signal from the acoustic waveguide 14 and convert the received acoustic signal into a corresponding electrical signal. It can be appreciated that some all of the acoustic transducers may be configured to both transmit and receive acoustic signal, that is, to function as transceiver transducers. Any or all of the acoustic transducers may be driven by piezoelectric operation, electromagnetic operation, or magnetostrictive operation as non-limiting embodiments.

In the embodiment of FIG. 1, the acoustic waveguide 14 is disposed on a surface of the downhole tool 10 such that the acoustic waveguide 14 is exposed to a fluid disposed in the borehole 2 (i.e. a borehole fluid) in order to characterize that fluid. In another embodiment, a sample of a formation fluid may be extracted from a wall of the borehole 2 penetrating the formation 4 by a formation tester (not shown). The sample may then be disposed on the waveguide 14 internal to the tool 10 for evaluation.

Figure 2:
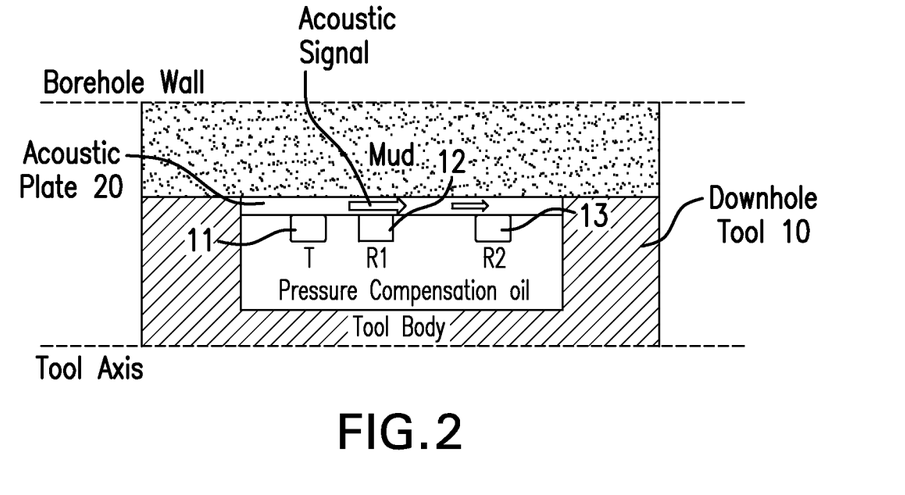
FIG. 2 depicts aspects of operation of the acoustic downhole tool.

Refer now to FIG. 2, which depicts aspects of operation of the acoustic downhole tool. Guided acoustic waves such as or similar to Lamb waves or Scholte waves are used to perform nondestructive evaluation of downhole fluids and materials. The guided waves can propagate across the thickness and along the length of a specimen disposed on an acoustic plate 20 of the waveguide 14. The characteristics of guided waves such as amplitude and velocity provide information about the downhole fluids and materials and dimension of the specimen. The acoustic waves are guided by the acoustic plate 20 that is exposed to the downhole fluid or material. By performing a time of flight measurement of the acoustic wave between the second acoustic transducer 12 and the third acoustic transducer 13, the acoustic velocity of the subsurface material disposed on the plate may be determined. By analyzing a decrease in amplitude of an acoustic wave as the wave traverses from the second acoustic transducer 12 to the third acoustic transducer 13, the acoustic impedance of the subsurface material disposed on the acoustic plate may be determined. In general, the acoustic impedance measurement relates to an amount of energy lost from guided waves in the acoustic plate due to the subsurface material of interest being in contact with the acoustic plate. For example, the energy of the guided waves in the acoustic plate is dissipated by the subsurface material in accordance with the acoustic impedance of the subsurface material.

Figure 3:
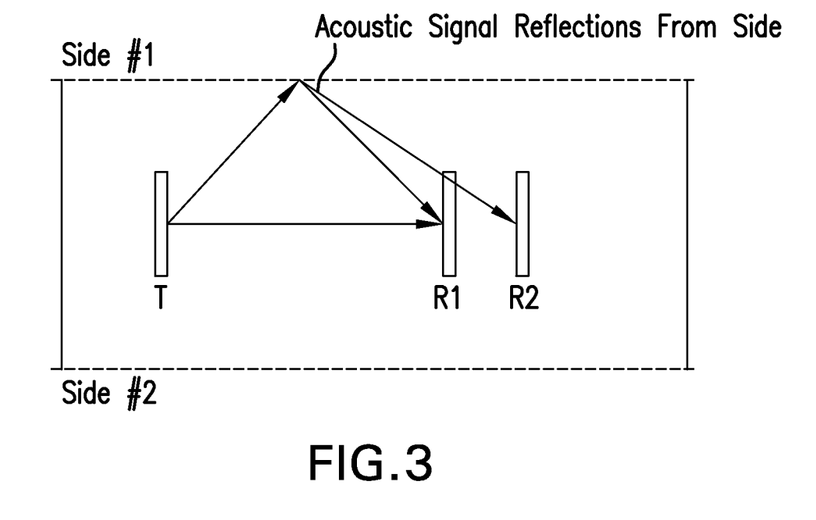
FIG. 3 depicts aspects of acoustic signal interference using a tool not having acoustic signal isolation.

Refer now to FIG. 3, which depicts aspects of acoustic signal interference using a tool not having acoustic signal isolation. In the top view of FIG. 3, it can be seen that an acoustic signal emitted at T will have a first component that is directly received by R1 and a second component that is received by R1 after the first component is received. The second component is due to a reflection off a side wall or structure. The side reflection can interfere with the direct signal and may lead to a low signal-to-noise ratio, inaccurate measurements or measurements that cannot be performed.

Figure 4:
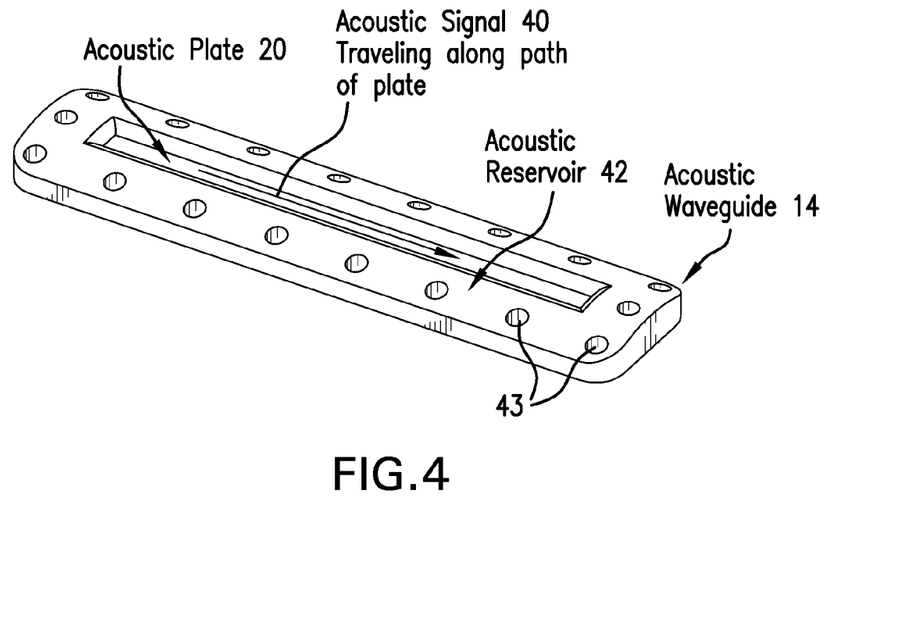
FIG. 4 depicts aspects of an acoustic waveguide in a three-dimensional view.
Figure 5:
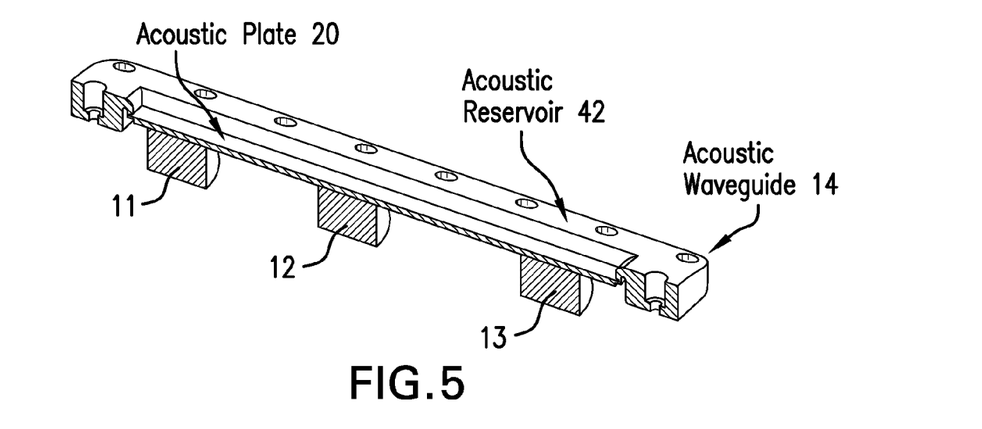
FIG. 5 depicts aspects of the acoustic waveguide in a three-dimensional cutaway view.

Refer now to FIG. 4, which depicts aspects of the acoustic wave guide 14 in a three-dimensional view. The acoustic waveguide 14 is configured to limit or prevent reflections of transmitted acoustic signals that may interfere with direct acoustic signals. The acoustic wave guide 14 includes the acoustic plate 20 along which an acoustic signal 40 travels longitudinally. The acoustic signal 40 is generated, propagated and detected in the acoustic plate 20. The acoustic waveguide 14 also includes an acoustic reservoir 42 that is configured to absorb acoustic signals that deviate from the longitudinal path of the acoustic plate 20. The acoustic plate 20 is acoustically isolated from the acoustic reservoir 42 in order to (1) prevent acoustic energy leakage to outside of the acoustic plate 20 and (2) prevent any acoustic energy leakage from the acoustic plate 20 that may occur from reflecting back to the acoustic plate 20 where it can cause interference. Hence, acoustic energy is mostly confined in the acoustic plate 20 and acoustic energy loss is limited, minimized or prevented. In one or more embodiments, the width of the acoustic plate is 1.5 cm and the length of the acoustic plate is at least ten times the width. Other dimensions and length-to-width ratios may also be used. In general, the acoustic plate 20 is rectangular in shape, but other shapes may also be used. In one or more embodiments, the acoustic waveguide 14 includes a plurality of holes 43 configured to accept threaded fasteners for attaching the acoustic waveguide 14 to a body of the downhole tool 10. Alternatively, the acoustic waveguide 14 may be secured to the tool by using an adhesive. In non-limiting embodiments, the acoustic waveguide 14 may be made of titanium, stainless steel or Inconel. In non-limiting embodiments, the acoustic wave guide 14 may be made of one monolithic material or may be made of joined materials. FIG. 5 illustrates a three-dimensional cutaway view of the acoustic waveguide 14 having the first, second and third transducers 11, 12 and 13 secured to and in acoustic communication with the acoustic plate 20. The transducers may be secured by an adhesive (not shown) or a mechanical fastener (not shown) such as a clip or threaded connector.

Figure 6:
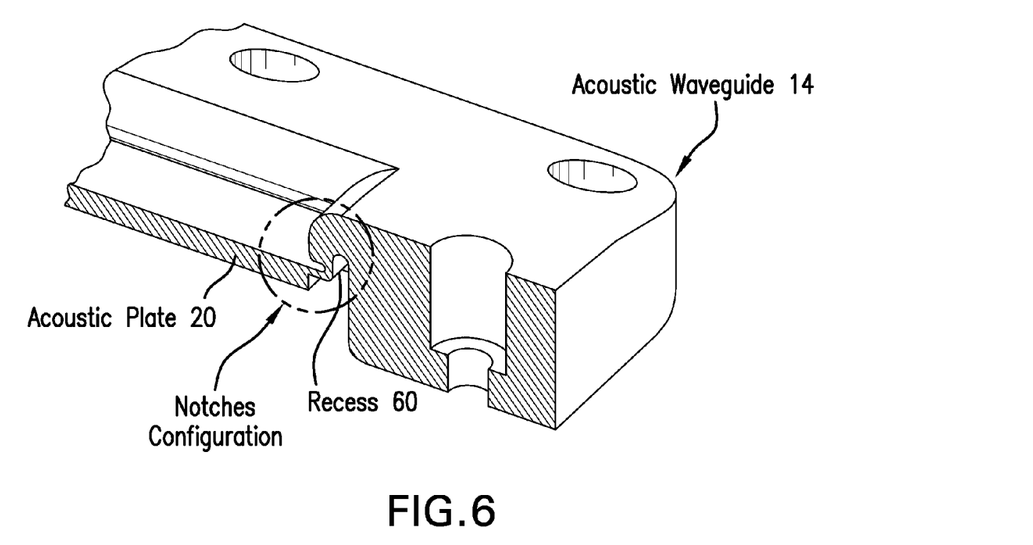
FIG. 6 depicts aspects of a notch configuration and an acoustic reservoir in the guided waves sensor for acoustic isolation and mechanical strength in a three-dimensional view.
Figure 7:
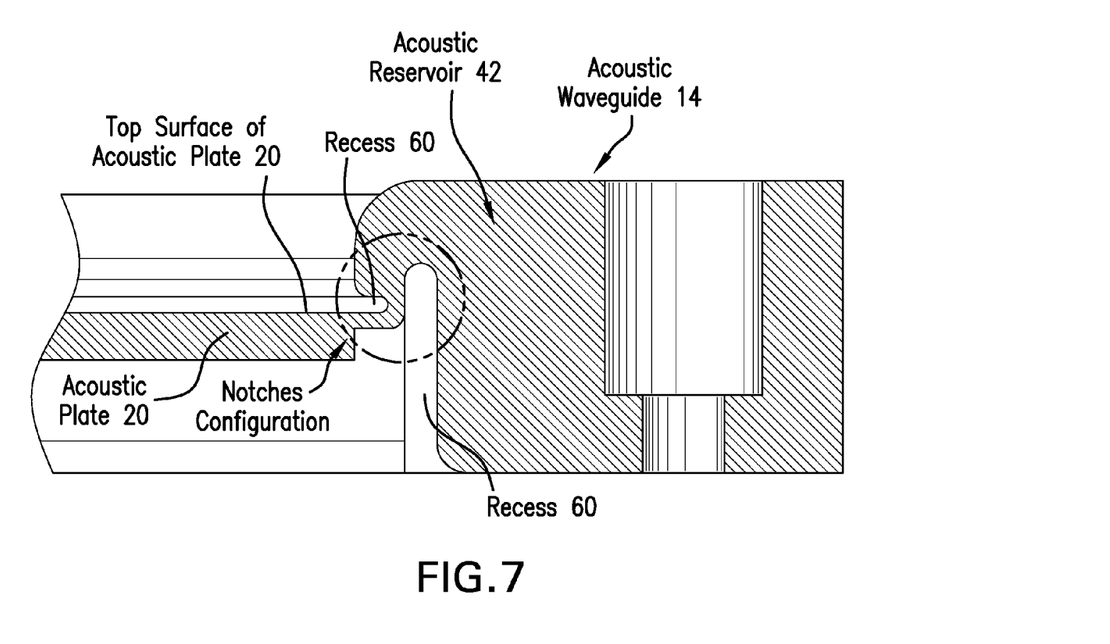
FIG. 7 depicts aspects of the notch configuration and acoustic reservoir in a side view.
Figure 8:
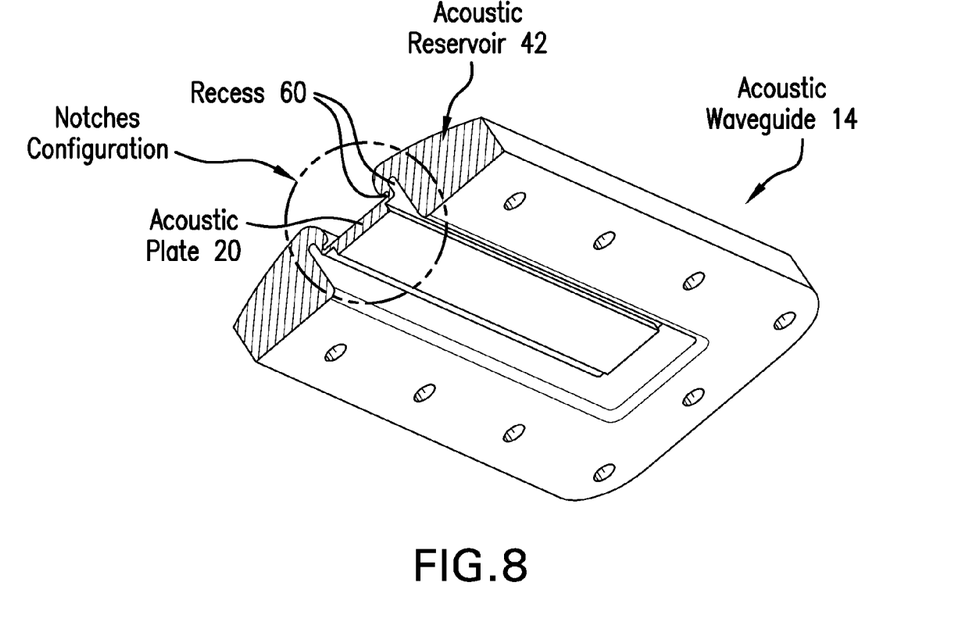
FIG. 8 depicts aspects of the notch configuration and the acoustic reservoir in an underside three-dimensional view.
Figure 9:
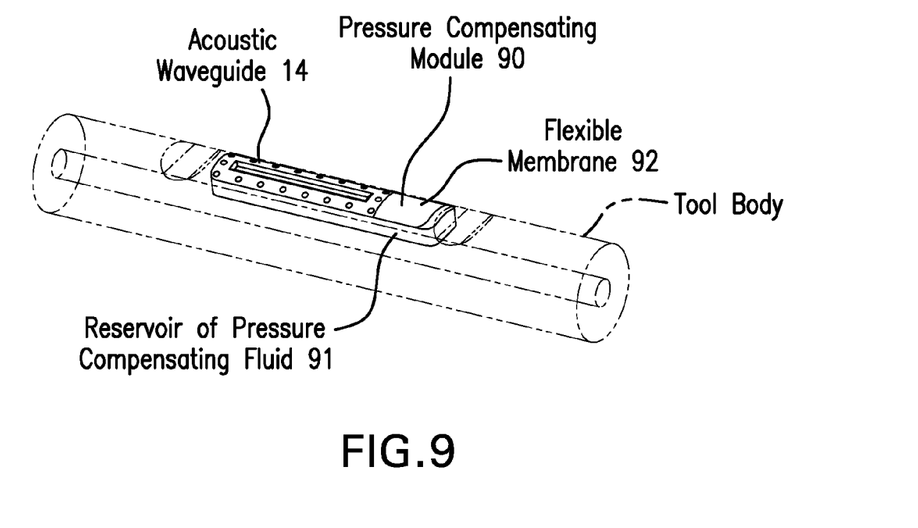
FIG. 9 depicts aspects of the guided wave sensor disposed in the downhole tool.

Refer now to FIG. 6, which depicts aspects of providing acoustic isolation of the acoustic plate 20 in a cutaway three-dimensional view. In the embodiment of FIG. 6, acoustic isolation of the acoustic plate from the acoustic reservoir is provided by one or more notches or recesses 60 surrounding the acoustic plate 20. The configuration of the recesses 60 limit or prevent the leakage of acoustic energy from the acoustic plate 20. One recess configuration may be described as a first recess between a top surface of the acoustic plate and the acoustic reservoir, the first recess at least partially surrounding the acoustic plate. Another recess configuration may be described as a second recess laterally surrounding at least part of the first recess. Any acoustic leakage that may occur can be absorbed by the acoustic reservoir 42. An upper edge of the acoustic reservoir 42 surrounding the acoustic plate 20 is curved in order to reflect any marginal acoustic leakage away from the acoustic plate 20. It can be appreciated that the notch or recess configuration also provides mechanical strength required for operation in the downhole environment. FIGS. 7 and 8 illustrate other cutaway views of the acoustic wave guide 14. FIG. 9 illustrates a three-dimensional view of the waveguide 14 attached to the body of the acoustic downhole tool 10. In the embodiment of FIG. 9, the waveguide 14 includes a pressure compensating module 90. The pressure compensating module 90 is configured to communicate borehole pressure to the acoustic transducers 11, 12, and 13 in order to pressure balance these acoustic transducers to allow them to operate at the high pressures that may be experienced downhole. The pressure compensating module 90 includes a reservoir 91 of pressure compensating fluid and a flexible membrane 92 that communicates the borehole pressure to the reservoir 91.

Figure 10:
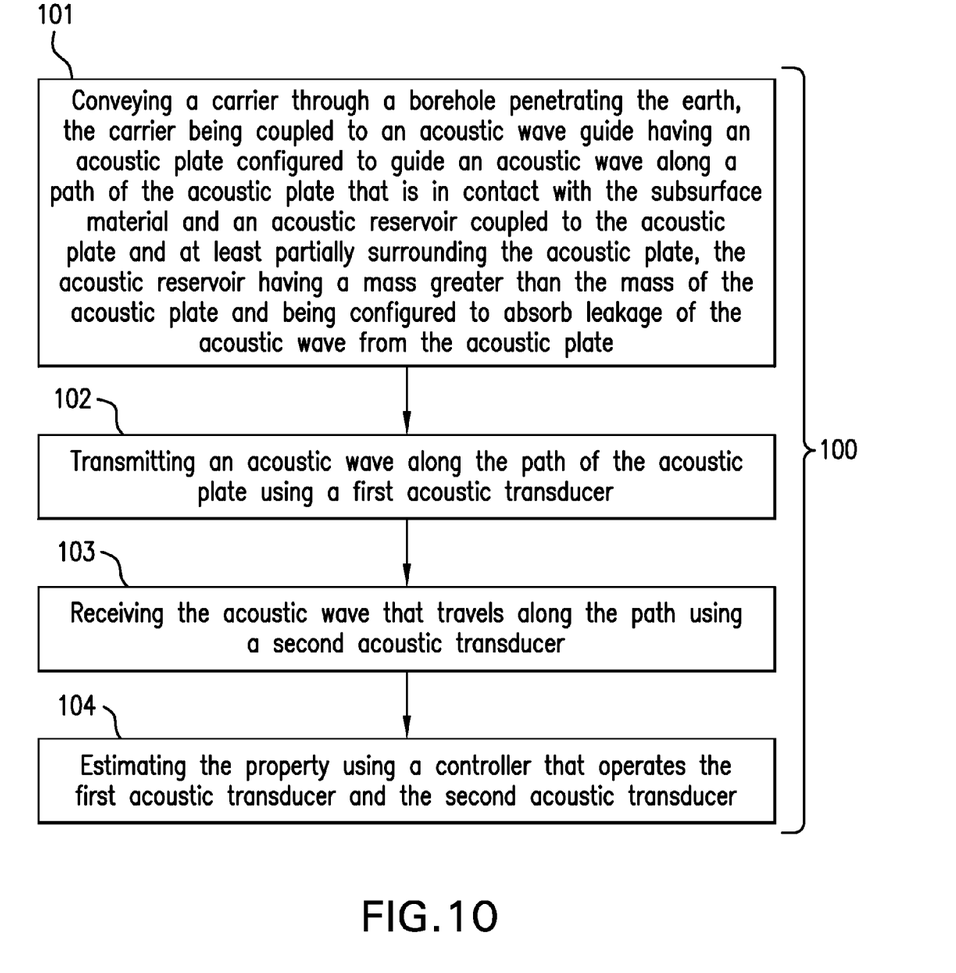
FIG. 10 is a flow chart for a method for estimating a property of a subsurface material.

FIG. 10 is a flow chart for a method 100 for estimating a property of a subsurface material. Block 101 calls for conveying a carrier through a borehole penetrating the earth, the carrier being coupled to an acoustic wave guide having an acoustic plate configured to guide an acoustic wave along a path of the acoustic plate that is in contact with the subsurface material and an acoustic reservoir coupled to the acoustic plate and at least partially surrounding the acoustic plate, the acoustic reservoir having a mass greater than the mass of the acoustic plate and being configured to absorb leakage of the acoustic wave from the acoustic plate. Block 102 calls for transmitting an acoustic wave along the path of the acoustic plate using a first acoustic transducer. Block 103 calls for receiving the acoustic wave that travels along the path using a second acoustic transducer. Block 104 calls for estimating the property using a controller that operates the first acoustic transducer and the second acoustic transducer. In one or more embodiments, the controller is configured to measure a time-of-flight of the acoustic signal and thus the sound velocity of the subsurface material in order to estimate the property. In one or more embodiments, the controller is configured to measure a decrease in amplitude of the acoustic signal as the acoustic signal travels along the path and thus measure the acoustic impedance in order to estimate the property of the subsurface material. The controller is coupled to the acoustic transducers, which are in turn coupled to the acoustic waveguide, and the assembly may be calibrated to accurately estimate the property by analysis or by testing with material of interest having known acoustic properties in a test laboratory or in the field.

The method 100 may also include absorbing leakage of the acoustic wave that leaks from the acoustic plate using the acoustic reservoir. The method 100 may also include reflecting leakage of the acoustic wave that is not absorbed by the acoustic reservoir away from the acoustic plate using a curved top surface of the acoustic reservoir. The method 100 may also include acoustically isolating the acoustic plate from the acoustic reservoir using a first recess between a top surface of the acoustic plate and the acoustic reservoir, the first recess at least partially surrounding the acoustic plate. The method 100 may further include isolating the acoustic plate from the acoustic reservoir using a second recess laterally surrounding at least part of the first recess.

The above disclosed techniques provide several advantages. One advantage is that use of the waveguide provides for measurements having lower acoustic signal reflections than without the waveguide and thus improved signal-to-noise ratio and/or improved measurement accuracy. Another advantage is that the disclosed embodiments of the waveguide are robust and operable in a downhole environment.

In support of the teachings herein, various analysis components may be used, including a digital and/or an analog system. For example, the downhole electronics 8 or the computer processing system 9 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of a subsurface material, the apparatus comprising:
   a carrier configured to be conveyed through a borehole penetrating the earth;
   an acoustic wave guide coupled to the carrier, the acoustic wave guide comprising an acoustic plate configured to guide an acoustic wave along a lateral path of the plate on which the subsurface material is disposed and an acoustic reservoir coupled to the acoustic plate and at least partially surrounding the acoustic plate, the acoustic reservoir having a mass greater than the mass of the acoustic plate and being configured to absorb leakage of the acoustic wave from the acoustic plate;
   a first acoustic transducer coupled to the acoustic plate and configured to transmit an acoustic wave along the path;
   a second acoustic transducer coupled to the acoustic plate and configured to receive the acoustic wave that travels along the path; and
   a controller configured to operate the first acoustic transducer and the second acoustic transducer in order to estimate the property.

2. The apparatus according to claim 1, wherein the acoustic plate is rectangular and the path is a longitudinal axis of the acoustic plate.

3. The apparatus according to claim 2, wherein a length of the acoustic plate is at least ten times a width of the acoustic plate.

4. The apparatus according to claim 3, wherein a thickness of the acoustic plate is less than the width of the acoustic plate.

5. The apparatus according to claim 1, wherein a top surface of the acoustic reservoir at least partially surrounding a top surface of the acoustic plate is curved and configured to reflect leakage of the acoustic signal from the acoustic plate that is not absorbed by the acoustic reservoir, wherein the curved top surface is configured to reflect the leakage away from the acoustic plate.

6. The apparatus according to claim 1, wherein the acoustic wave guide defines a first recess between a top surface of the acoustic plate and the acoustic reservoir, the first recess at least partially surrounding the acoustic plate, wherein the first recess is defined by the top surface of the acoustic plate and a surface of the acoustic reservoir that opposes the top surface of the acoustic plate.

7. The apparatus according to claim 6, wherein the acoustic reservoir defines a second recess laterally surrounding at least part of the first recess.

8. The apparatus according to claim 1, wherein the acoustic reservoir comprises a curved edge comprises a curved edge above a top surface of the acoustic plate, the curved edge being configured to reflect acoustic wave leakage away from the acoustic plate.

9. The apparatus according to claim 1, wherein the acoustic reservoir defines a plurality of holes configured to interface with a fastener configured to secure the acoustic wave guide to the carrier.

10. The apparatus according to claim 1, wherein the acoustic wave guide is one monolithic material.

11. The apparatus according to claim 1, wherein the acoustic wave guide comprises at least one of stainless steel, titanium, and Inconel.

12. The apparatus according to claim 1, wherein the second acoustic transducer comprises two acoustic transducers that are coupled to the acoustic plate and configured to receive the acoustic signal that travels along the path.

13. The apparatus according to claim 1, wherein the carrier comprises a wireline or a drill tubular.

14. A method for estimating a property of a subsurface material, the method comprising:
   conveying a carrier through a borehole penetrating the earth, the carrier being coupled to an acoustic wave guide comprising an acoustic plate configured to guide an acoustic wave along a lateral path of the acoustic plate on which the subsurface material is disposed and an acoustic reservoir coupled to the acoustic plate and at least partially surrounding the acoustic plate, the acoustic reservoir having a mass greater than the mass of the acoustic plate and being configured to absorb leakage of the acoustic wave from the acoustic plate;
   transmitting an acoustic wave along the path of the acoustic plate using a first acoustic transducer;
   receiving the acoustic wave that travels along the path using a second acoustic transducer; and
   estimating the property using a controller that operates the first acoustic transducer and the second acoustic transducer.

15. The method according to claim 14, further comprising absorbing leakage of the acoustic wave that leaks from the acoustic plate using the acoustic reservoir.

16. The method according to claim 15, further comprising reflecting leakage of the acoustic wave that is not absorbed by the acoustic reservoir away from the acoustic plate using a curved top surface of the acoustic reservoir.

17. The method according to claim 14, further comprising acoustically isolating the acoustic plate from the acoustic reservoir using a first recess between a top surface of the acoustic plate and the acoustic reservoir, the first recess at least partially surrounding the acoustic plate, wherein the first recess is defined by the top surface of the acoustic plate and a surface of the acoustic reservoir that opposes the top surface of the acoustic plate.

18. The method according to claim 17, further comprising isolating the acoustic plate from the acoustic reservoir using a second recess laterally surrounding at least part of the first recess.

* * * * *